United States Patent [19]

Nagy

[11] 4,222,283
[45] Sep. 16, 1980

[54] MANUAL TRANSMISSION LUBRICATION SYSTEM

[75] Inventor: Laszlo Nagy, St. Clair Shores, Mich.

[73] Assignee: General Motors Corporation, Detroit, Mich.

[21] Appl. No.: 900,732

[22] Filed: Apr. 27, 1978

[51] Int. Cl.$^2$ .......................... F16H 57/04; F01M 9/10
[52] U.S. Cl. ........................................ 74/467; 74/605; 184/6.12; 184/11 A
[58] Field of Search ................ 74/605, 467, 489, 492, 74/230, 710, 713; 184/6.12, 11 R, 11 A, 11 B

[56] References Cited

U.S. PATENT DOCUMENTS

| | | | |
|---|---|---|---|
| 1,898,700 | 2/1933 | Wert | 184/11 R |
| 1,978,835 | 10/1934 | Cotterman | 308/107 |
| 1,995,288 | 3/1935 | Acker | 184/6.12 |
| 2,049,234 | 7/1936 | Thomas et al. | 184/11 |
| 2,051,886 | 8/1936 | Neuland | 290/11 |
| 2,053,542 | 9/1936 | Vandervoort | 184/11 |
| 2,368,963 | 2/1945 | Boden | 184/11 R |
| 2,797,771 | 7/1957 | Orr | 184/11 R |
| 2,984,122 | 5/1961 | Woolley | 74/467 X |
| 3,065,822 | 11/1962 | McAfee et al. | 74/467 X |
| 3,097,546 | 7/1963 | Kelbel et al. | 74/467 X |
| 3,101,010 | 8/1963 | Popovich | 74/467 |
| 3,192,788 | 7/1965 | Fodrea | 74/467 X |
| 3,195,682 | 7/1965 | Reneerkens | 184/6.12 |
| 3,467,221 | 9/1967 | Janke | 184/6 |
| 3,618,711 | 11/1971 | Vollmer | 184/6.12 |
| 3,719,253 | 3/1973 | Dukes et al. | 184/6.12 |
| 3,785,458 | 1/1974 | Caldwell et al. | 184/6.12 |
| 3,951,476 | 4/1976 | Schulien et al. | 184/31 |

FOREIGN PATENT DOCUMENTS 1282299 11/1961 France ........................................ 74/467
1235459 6/1971 United Kingdom ...................... 74/467

*Primary Examiner*—Leslie Braun
*Attorney, Agent, or Firm*—Donald F. Scherer

[57] ABSTRACT

A transmission having a gravity feed and centrifugal pressure lubricating system. Rotating drive and output gearing throws oil to a primary collector for gravity feed down in a first passage in the housing to a through-bore in the output shaft and for feed upward in a second passage to a blind bore in the input shaft. Rotating high-speed gearing throws oil to a secondary collector for gravity feed in a second passage to the blind bore and then to the through-bore. A plastic disk, having a central aperture smaller than the shaft bores, is fixed and sealed in a chamber between each passage and each bore end. A disk resiliently engages a plastic ferrule in each open bore end to seal the disk to the shaft end to permit gravity flow of oil through the central aperture into the bores and to retain an annular body of oil in the bores during shaft rotation and to centrifuge the oil through radial ports to lubricate the drive gear bearings.

4 Claims, 10 Drawing Figures

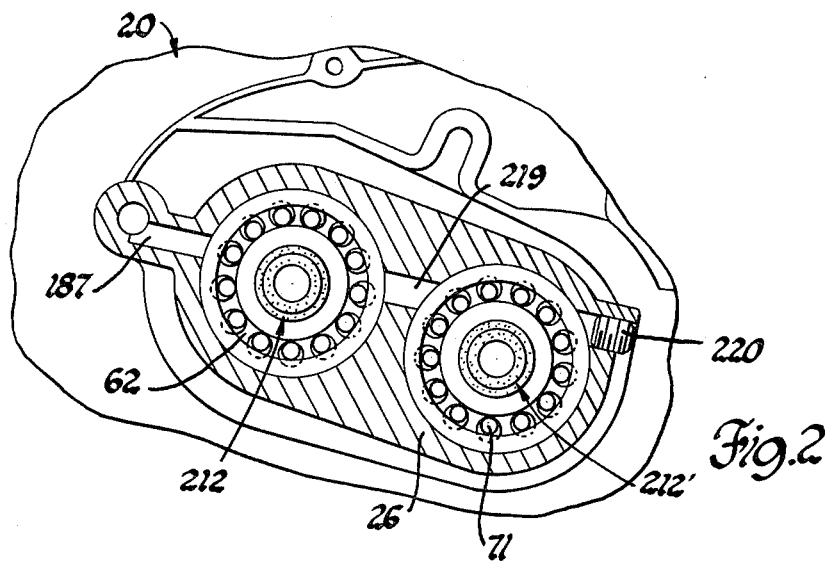
Fig.2
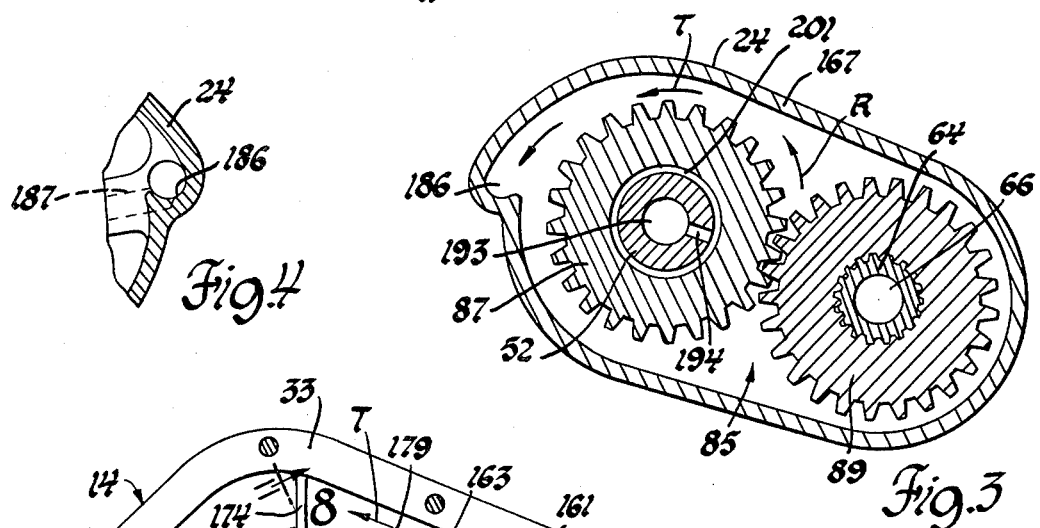
Fig.4
Fig.3
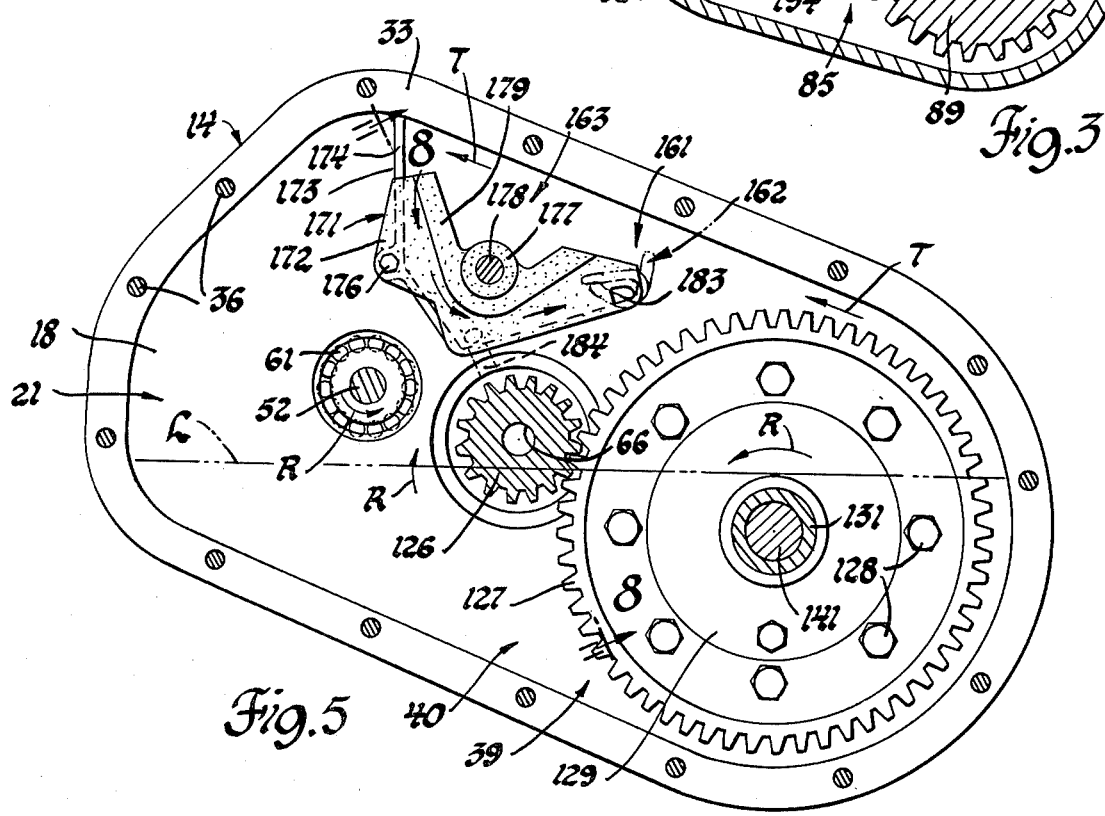
Fig.5

MANUAL TRANSMISSION LUBRICATION SYSTEM

This invention relates to lubricated transmissions and particularly centrifugal pressure lubricated transmissions.

A commonly owned related U.S. application is Ser. No. 892,954, filed Apr. 3, 1978, in the names of Laszlo Nagy and Donald J. Pulk, entitled "Transmission and Shift Linkage".

This invention provides an improved centrifugal pressure lubrication arrangement in gearing for a bearing on a shaft rotatably mounted in a housing having an improved collector arrangement for receiving oil thrown by multispeed transmission gearing and drive gearing during all phases of transmission operation and an improved arrangement for distributing lubricant to hollow input and output shafts for centrifugal pressure feed to bearings on the shafts.

The centrifugal lubrication system employs a hollow shaft rotatably mounted in a housing to centrifuge the lubricant. Thrown lubricant is collected and fed by gravity through a passage to a chamber in the housing at the end of a hollow shaft. In the improved arrangement, a shield having Belleville spring characteristics is mounted in the chamber with its outer perimeter sealed and axially fixed to the housing. The shield has a central aperture concentric with the shaft and its hollow or bore end having a smaller diameter than the bore to permit lubricant feed by gravity to the chamber to flow through the central aperture to the bore. The shield, preferably a disk, has light sealing engagement, due to its resilient Belleville spring action, with the shaft end or a sleeve fixed in the end of the bore, to retain an annular body of lubricant in the bore when the shaft is rotating to provide a centrifugal pressure lubrication through radial ports in the shaft to bearings. In the preferred arrangement, the sleeve is a furrule which is pressed in the bore in sealing relation and has an annular flange engaging the shaft end and contacted by the disk for sealing the disk to the end of the shaft. The disk and ferrule are made of a suitable thermoplastic resin, such as nylon.

The gearing throws lubricant during all phases of operation to collectors of the trough-type which feed the lubricant through gravity feed passages to chambers at the ends of the shafts for supply to the shaft bores for centrifugal bearing lubrication. The low-speed ratio gearing rotates with the input shaft, and the high-speed ratio gearing and output gearing rotate with the output shaft in neutral and in each gear ratio drive both shafts and all the gearing rotate. A primary collector includes an axial trough receiving lubricant thrown by all the speed ratio gearing and an end or transverse trough receiving lubricant thrown by the output gearing. During low speed or idle engine operation with the clutch engaged and driving the input shaft but with the transmission in neutral, the low speed gearsets rotate and throw sufficient lubricant to the axial trough of the primary collector to lubricate the bearings. When any drive gearset is engaged and the input or output is driven, all drive gears and the output gearing throw lubricant to the primary collector. The secondary collector has a trough which receives lubricant thrown by the high-speed ratio gearing to supplement the lubricant collected by the primary collector when a drive speed ratio is engaged during engine or overrun drive and during overrun drive in neutral.

The primary collector supplies lubricant to one end of the bore in the output chamber to fill the centrifugal chamber in the bore between the disks at each end. During rotation of the output shaft, lubricant is centrifuged through radial ports for centrifugal pressure feed to bearings on the output shaft, particularly the bearings rotatably mounting the drive gears on the output shaft. Continued lubricant feed during centrifugal pressure feed by the centrifuge arrangement in the output shaft provides surplus lubricant which is delivered through the output shaft and disk at the opposite end to chambers and passages in the housing for delivery through a disk to the similar bore and centrifuge arrangement in the input shaft.

The secondary collector delivers lubricant by gravity through a passage to a chamber at the end of the input shaft for feed through a disk to the bore and centrifuge device in the input shaft and may also flow by gravity to the output shaft, providing a counterflow supplemental to the primary collector flow. The primary collector is thus connected for gravity flow of lubricant to one end of the centrifugal pressure lubrication system and may supply the entire system. Similarly, the secondary collector is connected to the other end of the centrifugal pressure lubrication system and may also supply the entire system. Normally, however, each collector supplies an adjacent portion or end of the system. At low speeds primary collector flow is larger, while at high speeds secondary collector flow is larger. The disks retain sufficient lubricant in the bores during shutdown for immediate centrifugal lubrication during start-up.

These and other features of the invention are described in the following description and accompanying drawing of a preferred embodiment, wherein:

FIG. 2 is a partial sectional view of FIG. 1 on the line 2—2;

FIG. 3 is a sectional view of FIG. 1 on line 3—3;

FIG. 4 is a partial sectional view of FIG. 1 on line 4—4;

FIG. 5 is a sectional view of FIG. 1 on line 5—5;

Figure 1:
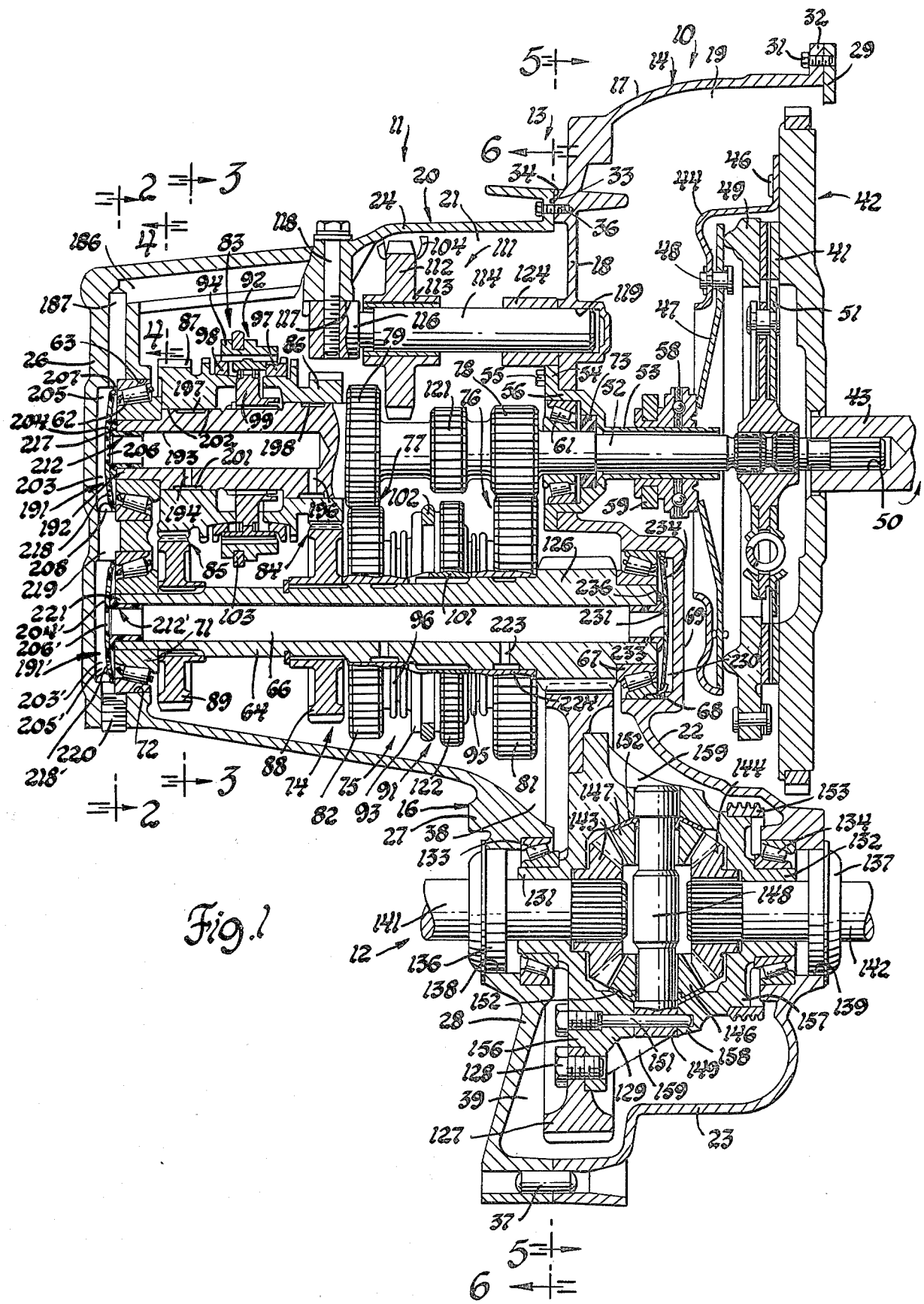
FIG. 1 is a developed and partial sectional view of the drive train with the reverse shift fork shown diagrammatically.

The drive train is especially suitable for a transverse engine and transmission installation in a front wheel drive vehicle and includes a gravity feed centrifugal pressure lubrication system. The drive train in which the invention is used has a main clutch 10, transmission 11, and differential 12 mounted in housing 13 formed as an assembly having a clutch housing part 14 and a transmission housing part 16. The clutch housing part 14 has a bell housing portion 17 surrounding main clutch 10, an intermediate wall portion 18 which, with bell housing portion 17, encloses the clutch chamber 19. The wall portion 18 also encloses the open end of pot-shaped gear housing portion 20 providing gear chamber 21. The one-piece clutch housing part 14 has, extending transversely from bell housing portion 17 and wall portion 18, a connecting portion 22 which merges into the differential housing portion 23. The one-piece transmission housing part 16 has a circumferential or peripheral wall 24 and an end wall 26, forming gear housing portion 20 enclosing gear chamber 21, and a connecting portion 27 which merges into a differential housing portion 28. The clutch housing part 14 is secured to the engine block 29 by fasteners 31 at flange 32 of bell housing portion 17. Clutch housing part 14 has, adjacent intermediate wall portion 18, a sealing face 33 in sealing contact with a sealing face 34 of transmission housing part 16 and are secured together by fasteners 36 and locating pins 37 to secure and seal transmission housing part 16 to clutch housing part 14 so as to form gear chamber 21, the connecting chamber 38, and differential chamber 39 together providing the complete lubrication or transmission chamber 40. Connecting chamber 38, between connecting portions 22 and 27, connects gear chamber 21 to differential chamber 39 between differential housing portions 23 and 28, respectively, of clutch housing part 14 and tranasmission housing part 16.

Main clutch 10 has a backing plate 41 formed as a portion of engine flywheel 42 which is driven by engine shaft 43 in the direction of the arrow, FIG. 1. A cover plate 44 is secured to flywheel 42 by fasteners 46. Plate spring 47 is centrally pivoted by annular pivot 48 secured to cover plate 44 and normally biases pressure plate 49 to engage driven plate 51 which is drive connected to transmission input shaft 52, conventionally supported in a bearing bore 50 of engine shaft 43. A ground sleeve 53 fits in an aperture 56 in intermediate wall portion 18 and has a flange 54 secured by fasteners 55 to intermediate wall portion 18. Clutch throw-out bearing 58 is actuated by conventional clutch lever 59 to move on ground sleeve 53 to compress plate spring 47 to release main clutch 10.

Input shaft 52 is rotatably supported by bearing 61 supported in flange 54 secured to intermediate wall portion 18, and by bearing 62 fixed in recess 63 in end wall 26. Output shaft 64 is a sleeve shaft having a central through-bore 66 and is rotatably supported at the output end by bearing 67 fixed in recess 68 in off-set wall portion 69 of intermediate wall portion 18, and at the other end by bearing 71 fixed in recess 72 in end wall 26. Bearings 61, 62, 67, and 71 are tapered roller bearings having their races secured by a press-fit in the associated housing portion and on the associated shaft. These bearings rotatably support input shaft 52 and output shaft 64 in spaced parallel relation to each other in end wall 26 of transmission housing part 16 and in intermediate wall portion 18. A seal 73 in sleeve flange 54 engages input shaft 52 in back of bearing 61 to seal the clearance between ground sleeve 53 and input shaft 52, so wall portion 18 is sealed so as to conventionally seal gear chamber 21 and lubrication chamber 40.

Forward gearing 74 has a first pair of gearsets 75 consisting of 1st and 2nd speed gearsets 76 and 77 respectively having input gears 78 and 79 fixed to, and preferably integral with, input shaft 52, and output gears 81 and 82 rotatably mounted by plain bearings 224 (described below) on output shaft 64; and a second pair of gearsets 83 consisting of 3rd and 4th speed gearsets 84 and 85 respectively having input gears 86 and 87 rotatably mounted by plain bearings 197, 198 (described below) on input shaft 52, and output gears 88 and 89 fixed by splines to output shaft 64. First and second synchromesh devices 91 and 92 are respectively located between the 1st and 2nd speed output gears 81 and 82 rotatable on output shaft 64 of the first pair of gearsets 75, and between the 3rd and 4th input gears 86 and 87 rotatable on input shaft 52 of the second pair of gearsets 83. First and second synchromesh devices 91 and 92 respectively have first and second shift collars 93 and 94 which are shown in the central neutral position, providing positive neutral. First shift collar 93, on shifting movement from neutral position selectively to the right or toward output gear 81, to 1st ratio position, engages 1st speed clutch 95 to clutch 1st speed output gear 81 to output shaft 64 to establish 1st ratio drive by 1st speed gearset 76, and to the left or toward 2nd speed output gear 82, in 2nd ratio position, engages 2nd speed clutch 96 to clutch 2nd speed output gear 82 to output shaft 64 to establish 2nd ratio drive by 2nd speed gearset 77. Second shift collar 94, on shifting movement from central neutral position shown, selectively to the right toward 3rd speed input gear 86, in 3rd ratio position, engages 3rd speed clutch 97 and clutches 3rd speed input gear 86 to input shaft 52 to establish 3rd ratio drive by 3rd speed gearset 84; and on movement to the left toward 4th speed input gear 87, in 4th ratio position, engages 4th speed clutch 98 and clutches 4th speed input gear 87 to input shaft 52 to establish 4th ratio drive by 4th speed gearset 85. The first and second shift collars 93 and 94 function as actuators respectively for 1st and 2nd speed clutches 95 and 96 and for 3rd and 4th speed clutches 97 and 98. In the second synchromesh device 92, collar 94 is splined to a hub 99 secured to input shaft 52 between 3rd and 4th input gears 86 and 87, so synchromesh device 92 rotates with input shaft 52 to throw lubricant when the input shaft rotates.

In the first synchromesh device 91, collar 93 is similarly splined to a hub 101 fixed on output shaft 64 and throws lubricant when the output shaft 64 rotates. The synchromesh devices 91 and 92 are similar. The sectional view in FIG. 1 of second synchromesh device 92 shows a preferred type of synchromesh device. Similar conventional synchromesh devices may be used. A conventional shift linkage is used having a 1-2 shift fork 102 to shift the first shift collar 93 between neutral, 1st and 2nd, a 3-4 shift fork 103 to shift the second shift collar 94 between neutral, 3rd and 4th, and a reverse shift fork 104 (diagrammatically shown in FIG. 1) to shift the reverse idler gear 112 between neutral and reverse.

The reverse gearing 111 has a reverse idler gear 112 having a sleeve hub 113 slidably and rotatably mounted on reverse shaft 114. Reverse shaft 114 has at one end a securing portion 116, which is an enlarged cylindrical end portion, seated in a shaft seat 117 of semicylindrical shape in peripheral wall 24 of gear housing portion 20 and secured therein by screw 118 extending through wall 24 and threaded into securing portion 116. The other end of reverse shaft 114 fits in a blind bore 119 in intermediate wall portion 18. Reverse idler gear 112 is shown in the neutral position where further or excess movement will be limited by securing portion 116 acting as a stop and engaging sleeve hub 113. In neutral position (as shown), reverse idler gear 112 is located between 2nd speed input gear 79 and reverse input gear 121 in the nape of the input and output gears on one side of the forward gearing 74. Reverse idler gear 112, on movement from neutral to reverse position, first meshes with reverse input gear 121 fixed on input shaft 52, and then with reverse output gear 122 fixed on or integral with first collar 93 which is drive connected by hub 101 to output shaft 64. Excess movement of reverse idler gear 112 beyond reverse position is limited by sleeve hub 113 engaging a stop ring 124 mounted on reverse shaft 114 and engaging intermediate wall portion 18.

In the gearing, input gears 78, 79, and 121 are fixed to input shaft 52 by integral construction. Output gears 88, 89, and 122 are fixed to output shaft 64 by splines, since rotary output gears 81 and 82 must first be assembled on the output shaft 64 because output drive gear 126 is fixed by integral construction to output shaft 64. Output drive gear 126 directly drives differential gear 127 secured by fasteners 128 to differential cage 129. Output drive gear 126 and differential gear 127 are spur gears providing the output gearing and extend through connecting chamber 38 formed by connecting portion 22 of clutch housing part 14 and connecting portion 27 of transmission housing part 16. Cage 129 has, on the differential gear side and the other side, respectively, integral sleeves 131 and 132. Sleeves 131 and 132 are rotatably supported by bearings 133 and 134. Bearings 133 and 134 and seals 136 and 137 are respectively mounted and secured in aperture 138 in differential housing portion 28 of transmission housing part 16, and in aperture 139 in differential housing portion 23 of clutch housing part 14. Half-shafts 141 and 142 are respectively contacted by seals 136 and 137 to seal differential chamber 39, rotatably supported in sleeves 131 and 132, and fixed by splines to bevel gears 143 and 144. Bevel gears 143 and 144 mesh with differential pinions 146 and 147, both mounted on pinion shaft 148, which is mounted in crossbore 149 and secured in differential cage 129 by pin 151. Thrust washers 152 are located between each pinion 146 and 147 and cage 129. Speedometer gear 153 is fixed on cage 129. The cage 129 between gear differential gear flange 156 and support flange 157 has, in the central portion 158 supporting pinion shaft 148, two apertures (not shown), one on each side of pinion shaft 148, and each extending about one-fourth of the perimeter of the cage. Four (4) webs 159 are formed integrally and coextensively with differential gear flange 156 and central portion 158, and are peripherally spaced from crossbore 149 for pinion shaft 148, and may be adjacent the apertures in central portion 158 and equally peripherally spaced. The webs 159 provide reinforcement for the cage 129 and act as impellers to throw lubricant during rotation of the differential gear 127.

The transmission has a lubrication system in which lubricant or oil, preferably automatic transmission fluid, is thrown by the gearing and collected in collectors or troughs and then fed by gravity to chambers at the ends of the shafts for direct oil feed to the shaft bearings in the housing, and to bores in the shafts for centrifugal pressure feed to bearings on the shafts for the rotatably mounted drive gears and also may be used for the shaft support bearings (e.g., bearing 67), especially if plain bearings are used and it is desired to supplement the direct feed and splash lubrication. The primary collector 161 (FIGS. 5 to 8) has an axial trough 162 and a transverse trough 163. The axial trough 162 (FIGS. 6 and 7) is formed integrally with the peripheral wall 24 of transmission housing part 16 and has a high-speed ratio portion 166 formed as a recess in the tapered small end portion 167 of peripheral wall 24, and a low-speed ratio portion 168 projecting freely and axially from the flared portion 169 of peripheral wall 24 to a free end 170 in transverse alignment with sealing face 34 of transmission housing part 16. The transverse trough 163 (FIGS. 5, 8, and 9) is provided by a plastic guide 171 which has a V-shape and a flat portion 172 secured and sealed to a guide rib 173, also having a V-shape, and extending axially from intermediate wall portion 18 to a sealing end face 174 aligned with sealing face 33 of clutch housing part 14. Fastener screw 176 secures one leg of flat portion 172 of guide 171 to end face 174 of rib 173 on intermediate wall 18. The guide 171 also has a stop ring portion 177 on the guide shaft 178 which is axially fixed in the transmission housing part 16 and intermediate wall 18 to support the 1-2 and 3-4 forward shift forks 102 and 103, respectively. Stop ring portion 177 abuts a boss 180 which supports guide shaft 178 on intermediate wall 18. The free end 170 of axial trough 162 abuts the other leg of flat portion 172 of guide 171 for sealing to guide rib sealing end face 174. The guide 171 has a flared portion 179 between stop ring portion 177 and flat portion 172. Guide 171, off-set wall portion 69 of intermediate wall 18, and guide rib 173 form transverse trough 163 of primary collector 161. Lubricant in axial trough 162 flows through an aperture 183 in flat portion 172 of guide 171 to transverse trough 163. Passage 184 provides the primary gravity feed passage for lubricant from axial trough 162 and transverse trough 163 to chamber 201.

The secondary collector or high-speed trough 186 (FIGS. 1 to 4 and 6) is formed in small end portion 167 of peripheral wall 24, preferably by drilling an enlargement at an offset in wall end portion 167. The high-speed trough 186 extends generally opposite the high-speed or 3rd and 4th speed gearsets 84 and 85. Although trough 186 is not directly opposite 3rd speed gearset 84, it is sufficiently opposite to collect oil thrown by the 3rd speed gearset 84. A passage 187 in end wall 26 connects trough 186 to oil receiving chamber 205 at the outboard end 192 of input shaft 52.

Figure 10:
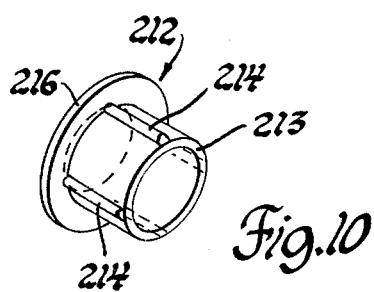
FIG. 10 is an enlarged perspective view of the ferrule.

An oil feed 191 for the input shaft 52 (FIG. 1) is provided at the outboard end 192 of input shaft 52 to feed oil to a bore 193 and bearing 62. Bore 193 is a blind bore and extends from outboard end 192 of and into shaft 52, past bearing 197 to a point concentric with bearing 198, and is connected by radial passages or ports 194 and 196 to the central annular chamber 201 of bearings 197 and 198. Each bearing 197 and 198 has a central annular chamber 201 between plain bearing portions 202 for receiving oil from ports 194 and 196 and distributing oil to the adjacent plain bearing portions 202. There is at least one radial port 194, 196, for each of the bearings 197 and 198 supporting rotary input gears 86 and 87, for 3rd and 4th ratios, on input shaft 52. A circular recess 203 is located in end wall 26 of transmission housing part 16 opposite the bearing 62 and outboard end 192 of input shaft 52. A shield or disk 204, made of nylon or other suitable thermoplastic resin and having an annular conical disk shape, acts as a Belleville spring and is located in circular recess 203. Shield 204 has a central aperture 206 concentrically aligned with and having a smaller diameter than bore 193. Shield 204, at its outer diameter peripheral edge 207, engages in sealing contact with the perimeter of recess 203 adjacent bearing 62, and has several locating ears 208 spaced about the outer diameter to axially locate shield 204 in recess 203 between end wall 26 and bearing 62 to provide an enclosed oil receiving chamber 205 at the outboard end 192 of input shaft 52 fed by passage 187. A sleeve 212 (FIGS. 1 and 10), of ferrule shape and made of nylon or other suitable thermoplastic resin, has a cylindrical sleeve portion 213 with external ribs 214 providing a tolerance accommodation for press-fitting and securing in bore 193, and an annular flange 216 in sealing engagement with the end face 217 of outboard end 192 of input shaft 52. Shield 204 is formed and functions like a Belleville spring and is prestressed during assembly to engage flange 216, so that an annular seal is provided at an inner annular portion around its central aperture 206. Shield 204 engages flange 216 with a low-pressure sealing engagement. A metering aperture 218, in shield 204 between the seal with flange 216 and the outer diameter, may be used to meter oil-flow to bearing 62. Central aperture 206 in shield 204 has an inner diameter less than the inner diameter of cylindrical sleeve portion 213, so sleeve 212 and shield 204 act cooperatively to dam and retain an annular body of oil in bore 193 during rotation of input shaft 52. Centrifugal force feeds oil through ports 194 and 196 to each of the central annular bearing chambers 201 for annular pressure feed to plain bearing portions 202 at each side of both bearings 197 and 198. The oil feed 191' (FIG. 1), at the outboard end 221 of output shaft 64, is like the above-described oil feed 191, so like reference numerals (primed) have been used and reference is made to the above description. The chambers 205 and 205', in recesses 203 and 203' respectively of oil feeds 191 and 191', are connected by connecting passage 219. Passages 219 and 187 in end wall 26 are made by a single drilled passage, drilled from the plug-end and closed by a plug 220. If not resisted by counterflow, oil feed 191' feeds oil to bore 66 of output shaft 64 for centrifugal force feed through radial ports 223 to bearings 224, one for each of rotary output gears 81 and 82. The bearings 224 are constructed like bearings 197 and 198.

An oil feed 226 is located at the output end 227 of output shaft 64 and is constructed and arranged relative to output end 227 of and bore 66 in output shaft 64, recess 228 in housing offset wall portion 69 opposite bearing 67 and output shaft 64, similar to oil feed 191, as described above relative to input shaft 52. Receiving chamber 230 is enclosed by shield 231, like receiving chamber 205. Sleeve 229 is the same as sleeve 212 and is similarly positioned in bore 66 at output end 227 of output shaft 64. Shield 231 is like shield 204 in that it has a central aperture 233, a metering aperture 234, and has sealing contact with the flange 236 of sleeve 229; but the outer edge of shield 231 is located and sealed in recess 228 to form receiving chamber 230 by an annular seal member 232 having its outer diameter sealed and secured by bearing 67 in recess 68. The gear chamber 21 is filled with lubricant, oil, or automatic transmission fluid, to level L (FIG. 5), and has known fill and drain ports with suitable closures (not shown).

Figure 6:
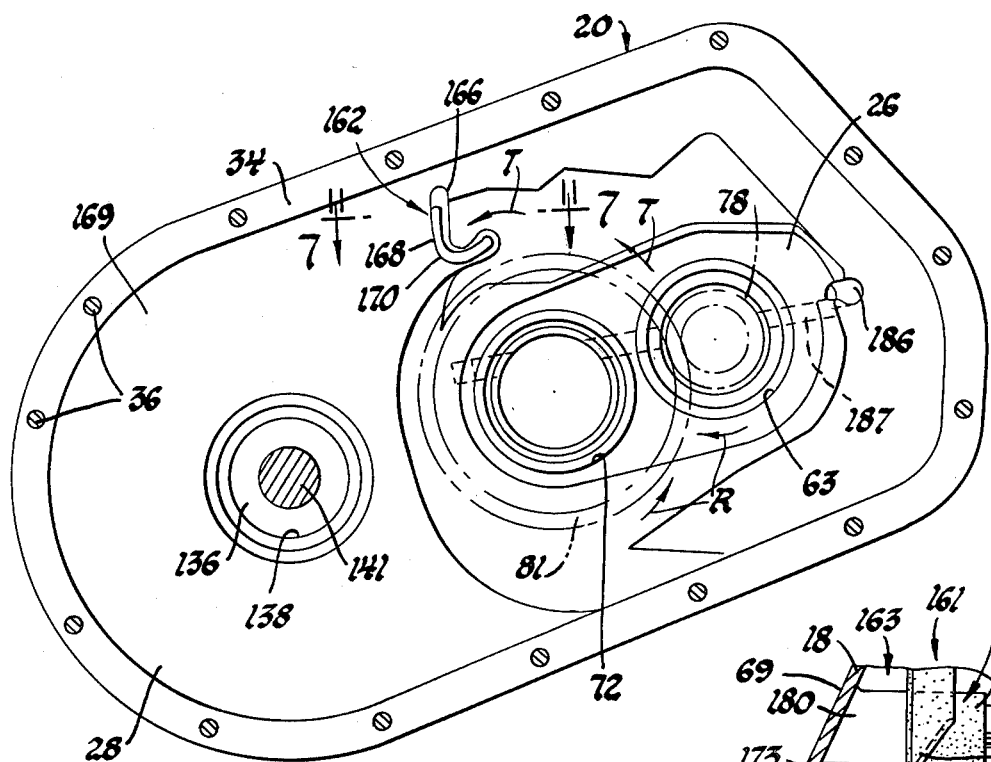
FIG. 6 is a partial sectional view of FIG. 1 on line 6—6 with the gearing omitted and the 1st speed gearing shown in phantom.
Figure 7:
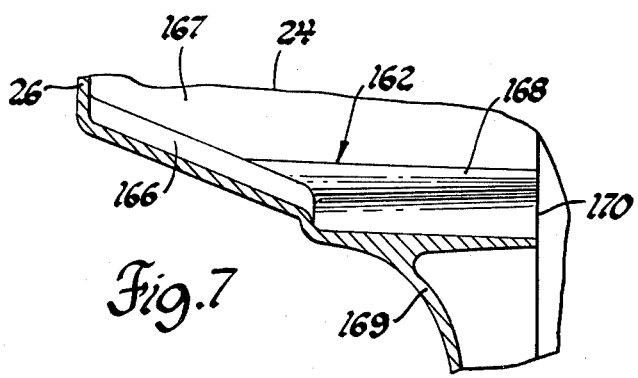
FIG. 7 is a partial sectional view of FIG. 6 on the line 7—7.
Figure 8:
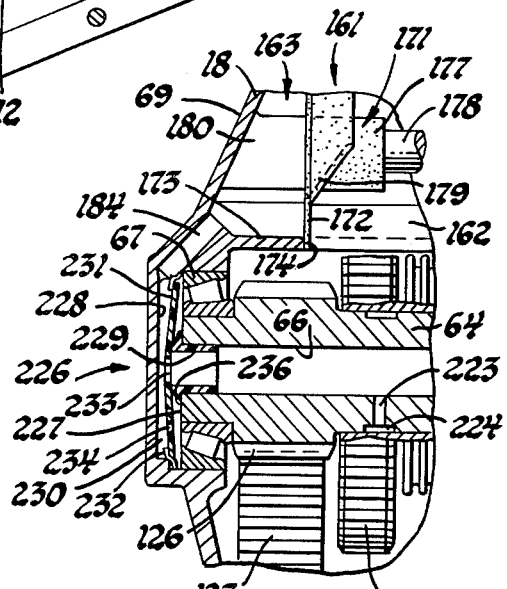
FIG. 8 is a partial sectional view of FIG. 5 on line 8—8.
Figure 9:
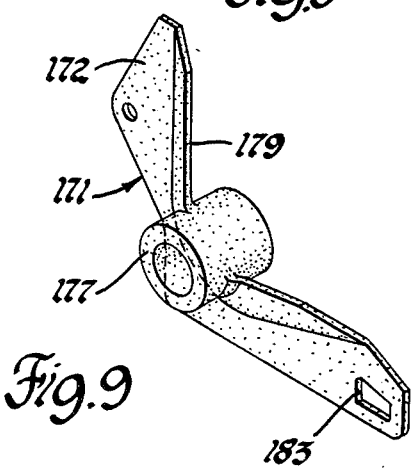
FIG. 9 is an enlarged perspective view of the end trough member.

The primary collector 161 includes axial and transverse troughs 162 and 163, respectively (FIGS. 5 to 8). The axial trough 162 extends axially with portions thereof transversely opposite the 1st and 2nd speed gearsets 76 and 77 and the 3rd and 4th speed gearsets 84 and 85. The transverse trough 163 is transversely opposite differential gear 127 to receive oil thrown by this gear of the output gearing 126,127. These troughs 162 and 163 are located above input shaft 52 and the highest receiving chamber 205, and are connected by passage 184, a gravity oil feed passage, to supply oil to receiving chamber 230. Transverse trough 163 collects a high volume of oil relative to vehicle speed, since it collects oil thrown in the direction of arrow T (FIG. 5) and impinging on rib 173, by large differential gear 127 which rotates in the direction of the arrow R (FIG. 5) when the vehicle is driven or coasting in the forward direction. Axial trough 162 collects thrown oil whenever either or both of the input and output shafts 52, 64, are rotating. When any of the 1st-to-4th speed gearsets 76, 77, 84, 85, and either synchromesh device 91, 92, rotate in the forward direction during drive or overrun, oil is thrown to axial trough 162 (as shown in FIG. 6) by the 1st speed gearset 76, rotating in the direction of arrow R, and throwing oil in the path of arrow T, to axial trough 162. Thus, trough 162 collects oil when the engine, with main clutch 10 engaged and the transmission in neutral, drives input shaft 52 to rotate the 1st and 2nd speed gearsets 76 and 77 at all speeds, idle to maximum. In neutral, during overrun, the 3rd and 4th speed gearsets 84 and 85 will throw oil to troughs 162 and 186. When any forward ratio drive is engaged, all gearsets will throw oil to trough 162 during drive and overrun. During reverse drive, the 1st and 2nd speed gearsets 76 and 77 will rotate in the same direction as in forward to throw oil. Since primary collector 161 supplies all oil fed at idle in neutral with the vehicle standing, it may be called the low-speed collector. Oil from axial trough 162 flows through aperture 183 in flat portion 172 to transverse trough 163 for flow by gravity through feed passage 184 to receiving chamber 230. The oil passes through metering aperture 234 of shield 231 to bearing 67 and, if not opposed by counterflow, the oil flows through central aperture 233 of shield 231 into bore 66 to be centrifuged through radial ports 223, to pressure-lubricate bearings 224 of 1st and 2nd speed gearsets 76 and 77. The oil feed-flows, if not opposed by counterflow, from receiving chamber 230 successively through bore 66 and central aperture 206' in shield 204' to receiving chamber 205' and through metering aperture 218' to lubricate bearings 71; through connecting passage 219 to chamber 205 through metering aperture 218 to lubricate bearings 62; and through central aperture 206 to bore 193 of input shaft 52 for centrifugal pressure lubrication through radial ports 196 to bearings 197 and 198.

The secondary collector or trough 186 (FIGS. 1 to 4) is formed within small end portion 167 of peripheral end wall 24 of gear housing portion 20, located above the axis of input shaft 52 and receiving chamber 205, and extends axially to provide portions in transverse alignment with 4th speed gearset 85, and near or in transverse alignment with 3rd speed gearset 84, so as to collect oil thrown by these high-speed ratio gearsets which rotate in all ratio drives and overrun drive with the output shaft 64. Trough 186 is located above receiving chamber 205 and connected by gravity oil feed passage 187 to chamber 205 to sufficiently fill chamber 205 for oil feed-flow through metering aperture 218 to bearing 62, and through central aperture 206 in shield 204 to bore 193 in input shaft 52 to lubricate bearings 197 and 198; and further, if not resisted by counterflow, by gravity flow through connecting passage 219 to chamber 205' for similar oil feed to bearings 71 and central bore 66 in output shaft 64. This secondary oil feed-flow originating at secondary collector trough 186 will, if not overcome by counterflow of the primary oil feed-flow from primary collector 161, continue on to oil feed 226 at output end 227 of output shaft 64, and pass through central aperture 233 and metering aperture 234 in shield 231 to lubricate bearings 67. At low speeds, flow will be provided mainly by the primary collector 161 and may supply all of the pressure lubrication system. As speed increases, the secondary collector 186 will supply additional oil and, at high speed, may supply all of the pressure lubrication system.

The seals between sleeves 212, 212', 229, and each associated shaft bore, and also between these sleeves and each associated shield 204, 204', 231, under static conditions, are sufficient to retain oil in shaft bores 66 and 193 for normal extended shut-down periods, so oil is available for lubrication on start-up. In the presently preferred embodiment, splash lubrication is sufficient to lubricate shaft support bearings 61, 62, 67, and 71, but in some embodiments is supplemented by metered oil flow through metering apertures 218, 218', and 234 for shaft support bearings 62, 71, and 67. During running operation, any small leakage at these seals or a metered groove leak may supplement or fully supply the metered oil flow which is preferably supplied by the metering apertures 218, 218', and 234. Radial passages in the shafts, like radial passages or ports 223, may be used to feed shaft support bearings.

The shields, e.g., 204, sleeves, e.g., 212, and guide 171 are preferably made of nylon or other suitable thermoplastic resin. The nylon shields have sufficient resilience to act as a Belleville spring, providing a light sealing pressure, and to accommodate for tolerance variation of the position of the end of the shaft. The nylon shields and sleeves have good bearing and wear properties for use in a rotary seal. The sleeves are deformable to accommodate for tolerance variation and the finish of the ferrous (e.g., iron or steel) shaft bore and annular end face. The guide 171 is sufficiently structurally rigid to provide a trough and a stop portion and deformable to accommodate for tolerances for a sealing and securing fit between the free end 170 of trough 162 of transmission housing part 16 and the end face 174 of guide rib 173 of clutch housing part 14.

It will be appreciated that modifications of the invention may be made.

I claim:

1. In a multispeed ratio transmission: a housing having first and second end walls; input and output shafts supported on said end walls; drive gear means having bearing means, low and high ratio gearsets each having an input gear on said input shaft and an output gear on said output shaft and said low and high ratio gearsets each having a neutral position to disconnect its ratio drive and being selectively engaged to respectively provide low and high ratio drive, one of said gears of one of said gearsets being rotatably mounted by said bearing means on one of said shafts and being selectively free and clutched to said one of said shafts for neutral and one of said ratio drives, and the other of said gears of said one of said gearsets being fixed to the other shaft; an output gearset having a drive gear fixed to said output shaft; centrifugal lubrication means having a through bore in said one shaft with a port connecting to said bearing means on said one shaft and said through bore having first and second open ends; first and second recesses respectively in said first and second end walls facing said first and second open ends; first and second disk springs each respectively having an outer portion secured and sealed to said first and second end walls around said first and second recesses to form first and second chambers, an inner portion spring biased for sealing contact respectively with said first and second open ends around said through bore, and an aperture concentric with and smaller in diameter than said through bore to retain lubricant in said through bore; said housing adapted to contain lubricant to a level above the lower portion of one of said input and output gears of each of said low and high ratio gearsets; first collection means collecting lubricant thrown by said low and high ratio and output gearsets located above said first and second chambers and connected for gravity feed lubricant flow during idle and low speed operation to said first chamber and flow through said aperture in said first disk spring to said through bore for centrifugal pressure lubrication of said bearing means; second collection means collecting lubricant thrown by said high ratio gearset located above said first and second chambers and connected for gravity feed lubricant flow during high speed operation to said second chamber for flow through said aperture in said second disk spring to said through bore for centrifugal pressure lubrication of said bearing means, and first and second ferrules respectively having first and second sleeve portions secured in said first and second open ends of said through bore and first and second annular flanges engaging said first and second open ends of said one shaft around said through bore and being sealed to said one shaft; said first and second disk springs being biased to engage respectively said first and second annular flanges to provide a fluid seal therebetween, and said disk springs and ferrules being made of a thermoplastic resin having resilience to provide a bias force to sealingly engage said flanges of said ferrules and to accommodate for tolerance variation of the position of said first and second open ends of said one shaft, and said ferrules being deformable for securing in said first and second open ends of said through bore and for sealingly engaging said one shaft with accommodation for tolerance variation.

2. In a transmission: a housing; gear means including first and second bearing means, a shaft rotatably mounted in said housing by said first bearing means and having a central bore with an open end at one end of said shaft, and a gear mounted on said shaft by said second bearing means for rotation relative to said shaft; gravity feed lubrication means including a collecting chamber mounted inside said housing above said shaft to receive splash lubricant from said gear means during rotation of said gear means; a port connecting said central bore to one of said first and second bearing means, a recess in said housing adjacent to and facing said open end of said bore at said one end of said shaft; a Belleville spring shield having an outer portion secured and sealed to said housing to enclose said recess and form a feed chamber and having an inner portion biased to sealingly engage said one end of said shaft around said open end of said central bore and having a central aperture of smaller diameter than and concentric with said central bore to provide an annular dam at said open end; means including said annular dam and retention means at the opposite end of said central bore to retain an annular body of lubricant in said bore during rotation of said shaft; a gravity feed passage connecting said collecting chamber for gravity feed of lubricant from said collecting chamber to said feed chamber, through said central aperture to said central bore for centrifugal pressure feed through said port to said one of said first and second bearing means, and a ferrule having a sleeve portion secured in said open end of said bore and an annular flange engaging said one end of said shaft around said open end of said bore and being sealed to said shaft; said Belleville spring shield being biased to engage said annular flange to provide a fluid seal therebetween, and said Belleville spring shield and ferrule being made of a thermoplastic resin having resilience to provide a bias force to sealingly engage said flange of said ferrule and to accommodate for tolerance variation of the position of said one end of said shaft, and said ferrule being deformable for securing in said open end of said bore and sealingly engaging said shaft with accommodation for tolerance variation.

3. In a multispeed ratio transmission: a housing having end walls; a pair of shafts extending between said end walls; shaft bearing means rotatably supporting and axially locating each shaft at each end on the adjacent one of said end walls; gear means providing a plurality of ratio drives between said shafts and including gear bearing means and a plurality of pairs of meshing gears, one pair having one gear continuously drive connected to one shaft and the other gear selectively engaged to the other shaft for drive and rotatably mounted on said other shaft by said gear bearing means for rotation in neutral and when another pair of meshing gears is driving; gravity feed lubrication means including a collecting chamber mounted inside said housing above said other shaft to receive splash lubricant from said gear means during rotation of said gear means, said other shaft having a central bore with an open end at one end of said other shaft and a port connecting said central bore to one of said shaft and gear bearing means, a recess in one end wall adjacent to and facing said one end of said other shaft; a Belleville spring shield having an outer portion secured and sealed to said one of said end walls to enclose said recess and form a feed chamber and having an inner portion biased to sealingly engage said one end of said other shaft around said central bore and having a central aperture of smaller diameter than and concentric with said central bore to provide an annular dam at said open end of said bore; retention means including said annular dam and other retention means at the opposite end of said central bore to retain an annular body of lubricant in said bore in said other shaft during rotation of said other shaft, a gravity feed passage connecting said collecting chamber for gravity feed of lubricant from said collecting chamber to said feed chamber through said central aperture to said central bore for centrifugal pressure feed through said port to one of said shaft and gear bearing means, and a ferrule having a sleeve portion secured in said open end of said bore and an annular flange engaging said one end of said other shaft around said open end of said bore and being sealed to said other shaft; said Belleville spring shield being biased to engage said annular flange to provide a fluid seal therebetween, and said Belleville spring shield and ferrule being made of a thermoplastic resin having resilience to provide a bias force to sealingly engage said flange of said ferrule and to accommodate for tolerance variation of the position of said one end of said other shaft, and said ferrule being deformable for securing in said open end of said bore and sealingly engaging said other shaft with accommodation for tolerance variation.

4. In a multispeed ratio transmission: a housing having first and second end walls; shaft bearing means; ferrous input and output shafts extending in parallel between and rotatably and axially supported by said shaft bearing means at first and second ends respectively on said first and second end walls; drive gear means having low and high ratio bearings, low ratio gear means near said first end wall with an input gear fixed to said input shaft and an output gear rotatably mounted by said low ratio bearing on said output shaft and selectively free and clutched to said output shaft for neutral and low ratio drive, and high ratio gear means near said second end wall with an output gear fixed to said output shaft and an input gear rotatably mounted by said high ratio bearing on said input shaft and selectively free and clutched to said input shaft for neutral and high ratio drive; output gear means having a drive gear fixed to said output shaft adjacent said first end wall for output drive; centrifugal lubrication means having a through bore in said output shaft with a port connecting to said low ratio bearing and with first and second open ends respectively at said first and second ends; a blind bore in said input shaft with a port connecting to said high ratio bearing and with a third open end at said second end; first, second, and third thermoplastic resin ferrules sealed and secured in and having respectively first, second, and third annular seals around and beyond said first, second and third open ends; a first recess in said first end wall facing said first open end; second and third recesses in said second end wall respectively facing said second and third open ends; first, second, and third thermoplastic resin disk springs each respectively having an outer portion secured and sealed to the end wall around said first, second, and third recesses to form first, second, and third chambers, an inner portion spring-biased for sealing contact with said first, second, and third annular seals, and first, second, and third apertures concentric with and smaller in diameter than the bore which it faces for lubricant flow to and from said bores and to retain lubricant in said bores; said housing adapted to contain lubricant to a level above the lower portion of one of said input and output gears of each of said low and high ratio gear means; connecting means for lubricant flow between said second and third chambers; first collection means collecting lubricant thrown by said low and high ratio and output gear means located above all said chambers and connected for the predominant gravity feed lubricant flow during idle and low speed operation to said first chamber and sequential flow through said first aperture to said through bore for centrifugal pressure lubrication of said low ratio bearing and flow through said through bore, said second aperture, said second chamber, said connecting means, said third chamber and third aperture to said blind bore for centrifugal pressure lubrication of said high ratio bearing; and second collection means collecting lubricant thrown by said high ratio gear means located above all said chambers and connected for the predominant gravity feed lubricant flow during high speed operation to said third chamber and by said connecting means to said second chamber for flow through said third aperture and second aperture respectively to said blind bore and through bore for centrifugal pressure lubrication of said high ratio and low ratio bearings.

* * * * *